Sept. 20, 1932.    F. M. REID    1,877,970
TANDEM WHEEL CONSTRUCTION
Filed March 12, 1930
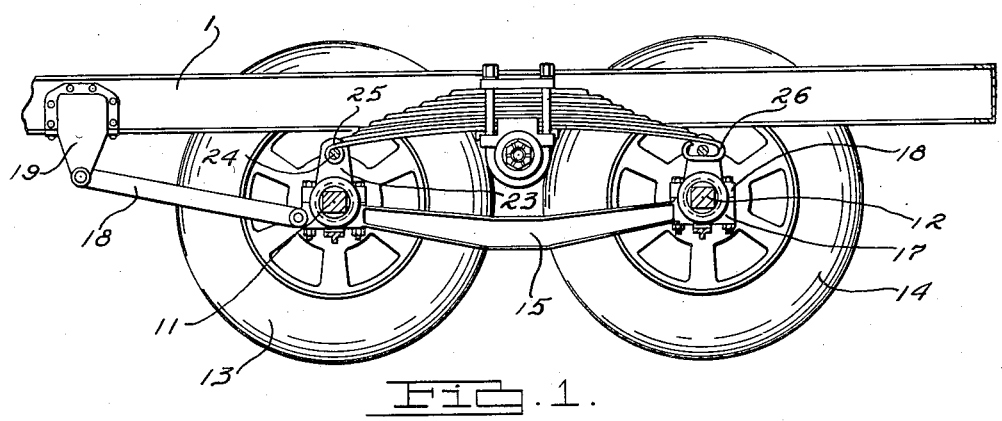
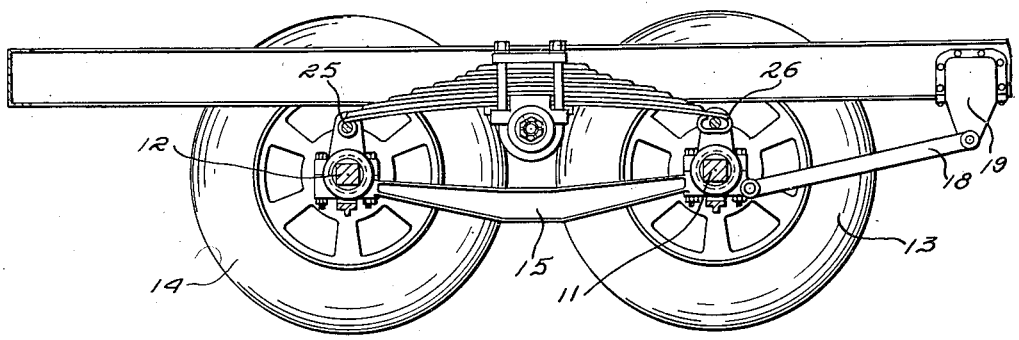
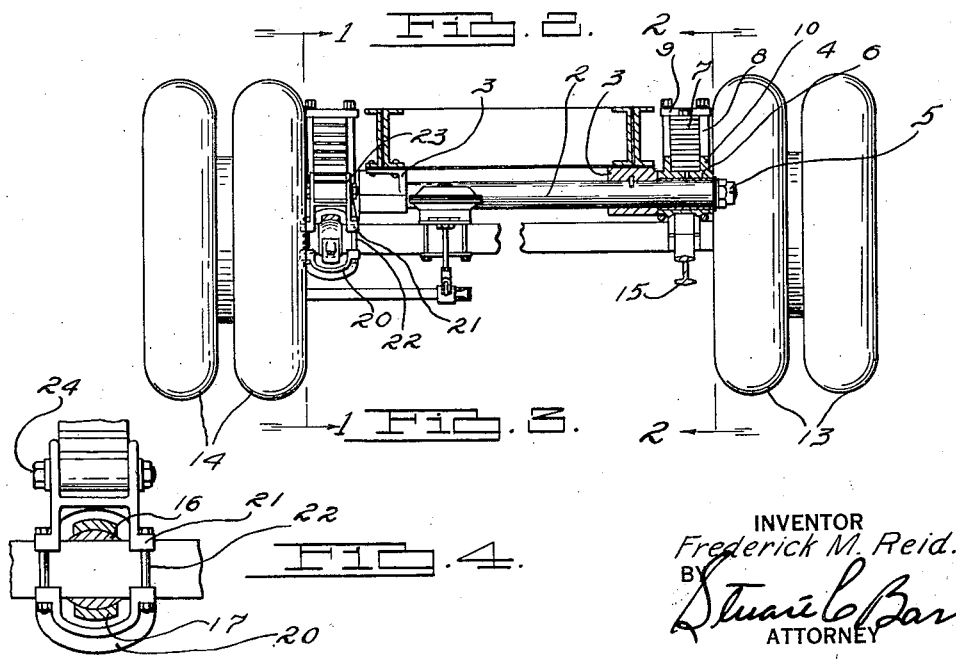
INVENTOR
Frederick M. Reid.
BY
ATTORNEY Patented Sept. 20, 1932

1,877,970

UNITED STATES PATENT OFFICE

FREDERICK M. REID, OF DETROIT, MICHIGAN, ASSIGNOR TO FRUEHAUF TRAILER COMPANY, OF DETROIT, MICHIGAN, A CORPORATION OF MICHIGAN

TANDEM WHEEL CONSTRUCTION

Application filed March 12, 1930. Serial No. 435,334.

This invention has to do with a road vehicle, and particularly one for heavy service in that the invention is directed towards the provision of road engaging wheels arranged in tandem.

The construction of the invention is useful for various types of vehicles, as for example, a trailer vehicle either of the well known "semi-trailer" type wherein the rear of the trailer frame is supported by ground engaging wheels and the forward end rests upon a tractor, or in the "full trailer" which is a complete vehicle in itself having road engaging wheels at each end. Moreover, the invention is concerned particularly with various features of spring and axle mounting with relation to each other and to the vehicle frame and other associated parts, and in this regard the structure may be employed in a road vehicle which has its own power plant, such as the well known tractor or truck.

In accordance with the invention load supporting springs are provided which connect the vehicle frame and the axles. The springs are of the usual leaf type and of camber construction, and accordingly the overall length of the springs vary upon spring flexure. This results in the necessity of providing a compensating arrangement to take care of this action. This the invention does, while at the same time the two tandem axles are held in substantial parallelism crosswise of the vehicle frame. The invention will be better understood when the following detailed description is followed in conjunction with the accompanying drawing:

Fig. 1 is a view of a part of a vehicle frame illustrating the tandem wheel and associated construction embodying the invention, showing the axles in section and with some parts cut away for clarity, the view being taken substantially on line 1—1 of Fig. 3.

Fig. 2 is a similar view of the other side of the axle with the vehicle extending in the opposite direction.

Fig. 3 is a composite rear end elevation in section.

Fig. 4 is an enlarged sectional view showing the mounting of the spring brackets on the axle and also the distance rods.

The vehicle frame is illustrated at 1, and this frame carries one or more journal devices for the weight supporting springs. In the present form the journaling device takes the form of a transverse shaft or journal rod 2 connected to the frame as by means of brackets 3. At each side of the frame there is a spring seat 4 journaled on the shaft 2 and held thereon as by means of a suitable nut 5, and preferably a suitable anti-friction bearing or bushing 6 is provided.

A spring 7 is placed on the seat and held thereon by U bolts 8 and clamp plate 9. This construction is identical on each side of the machine, and accordingly, only one side need be described. It is to be noted that the spring seat has wings 10 extending upwardly and embracing several leaves of the spring on their sides.

A pair of axles are shown, the axle 11 being the forward axle and the axle 12 the rearward axle carrying, respectively, wheels 13 and 14. These axles are associated with each other so that they are maintained substantially parallel in the several relative movements of the axles with respect to each other and with respect to the vehicle frame as the same is moved over a highway. For this purpose distance rods 15 are provided, one on each side of the vehicle. These distance rods are connected to the axles so that the axles may have relative rotation on their axial centers. In other words, the distance rods are rotatably connected to the axles with the center of rotation on the axial centers of the axles. This is accomplished in the present instance by the means of a ball-like member secured to the axles, as illustrated in Fig. 4, by character 16. The distance rods have bearing shaped ends, as illustrated at 17, which in conjunction with caps 18 through which bolts pass, surround the ball like members. Thus, there is in effect a ball joint between the distance rods and axles with the center of the ball at the axial center of the axles. Radius rods 18 are used which are connected to the axles and to the frame as by means of suitable brackets 19. These radius rods extend, preferably, from the forward axle to the bracket on the frame positioned forwardly of the wheels.

The ends of the springs are connected to the axles through suitable brackets; these brackets comprise a lower axle engaging member 20 and an upper engaging axle member 21 clamped to the axle by means of suitable bolts 22, and advantageously, these brackets are so constructed as to be mounted over the ball joint between the axle and distance rods. The upper bracket has wings or extensions 23 spaced apart for supporting spring eye-bolts 24.

The spring on one side of the vehicle has a forward bolt eye, as illustrated at 25, which has a mechanically good fit with the bolt 24, whereas the rear spring eye is elongated, as at 26. The spring on the opposite side is just reversed with the elongated eye positioned adjacent the forward axle and the mechanically good fitting eye at the rearward axle. It will also be noted that the wings or members 23 extend an appreciable distance above the eye bolts so as to embrace several leaves at the sides of the springs.

In the operation of such a vehicle over the highway it will be noted that the distance rods maintain the axles in substantial parallelism. As the springs are flexed the lengthening and shortening thereof is taken care of due to the elongated spring eye. The axle 11 is held in a relatively fixed position by means of the snug spring eye on one side of the vehicle; when the spring is flexed downwardly the point of swiveling at the eye bolt 24 is moved so that the axle is rocked about its own axis. This is readily permitted due to the ball joint with the distance rod so that the distance between the axles is still maintained. The axle 12, upon spring flexure, is likewise given a rotation on its own axis by the spring eye having a tight fit, but located in the spring on the opposite side of the vehicle. In either or both events relative movement can take place between one end of each spring and one axle. Normally each axle is held in fixed position, as each has one relatively tight spring eye, and one a relatively elongated spring eye.

There are other movements which, in conjunction with the spring action, create a rather complicated movement of the axles and parts with respect to the frame. For example, when the springs are flexed under load the radius rod 18 moves thus causing the axle connected thereto to move in an arc around the point of connection as a center where the radius rod joins the bracket on the frame. As Fig. 1 is viewed it will be readily appreciated that this will bodily displace axle 11 with respect to the vehicle frame, while the point 24 is not so bodily displaced because it is held by the spring and this causes rocking of the axle on its axis. Similarly, axle 12 is displaced due to the rigid distance rod 15, but the movement is permitted by the elongated eye 26. On the other side of the vehicle, as viewed at Fig. 2, the arrangement of the spring attachments are reversed, and the resulting movement in the elongated spring eye is similar.

The wings 10 of the center spring brackets and the extending plates 23 serve to engage several of the longer leaves of the spring so that twisting strains are met not alone by the lowermost leaf in the spring, but by two or three of the longer leaves, depending upon leaf thickness and the height to which the wings 10 and parts 23 extend.

Due to this structure a tandem wheel construction is provided wherein the frame is spring suspended, but wherein no rigid weight-supporting rocker arms, or other similar devices need be utilized between the frame and running gear inasmuch as the springs themselves serve this purpose. Although the springs vary in length, free movement is provided to take care of this, and notwithstanding this, each axle is held in position with respect to the frame and with respect to each other, and with respect to the springs.

I claim:

1. A tandem wheel construction comprising in combination with a vehicle frame a leaf spring pivotally mounted to the frame near each side of the frame, a pair of axles, means pivotally connecting the ends of the springs to the respective axles eccentrically thereof, the means at at least one end of each spring comprising elements for compensating for variation in spring length incident to spring flexure, distance rods connecting the axles bearing substantially no load, and ball and socket means joining the distance rods and axles so that each axle can rock with respect to the distance rods around its own center, the said compensating means at one end of each spring being located at the forward end of one spring and at the rear end of the other.

2. A tandem wheel construction, comprising in combination with a vehicle frame, a pair of axles, a ball formation on each axle with the ball center located at the axle center, a rigid distance rod having a socket-like member at each end seated on said balls whereby the axles may rock with respect to the distance rods around their own centers, weight-supporting springs connecting the frame and axles, and a radius rod for maintaining the axles in predetermined position with respect to the frame, one end of each spring being connected to its respective axle through the means of relatively movable parts permitting variation of spring length, and the said ends of the weight-supporting springs being reversed in this respect.

3. The combination of a vehicle frame, a pair of axles, one positioned forward of the other, a ball-like member near each end of each axle, a pair of distance rods connecting the axles each having bearing members swiveled upon the ball-like members on the axles, a pair of spring brackets carried by each axle and projecting upwardly therefrom, a leaf spring on each side of the frame extending fore and aft, means pivotally mounting each spring to the vehicle frame substantially on its center line, means connecting the forward end of one spring to a bracket on the forward axle so that upon spring flexure the axle may be rocked on its own axis, means connecting the rear end of said spring to a bracket on the rear axle arranged to permit relative movement between the rear end of the spring and axle upon the spring flexure, means connecting the rear end of the other spring to a bracket on the rear axle so that upon spring flexure the axle may be rocked on its axis, means connecting the front end of said other spring to a bracket on the forward axle arranged to permit movement between the spring and axle upon spring flexure, and one or more radius rods pivotally connected to the frame and pivotally connected to the axle and distance rod structure.

In testimony whereof I affix my signature.

FREDERICK M. REID.